March 11, 1958 M. U. MUSLER 2,826,334
CONTAINER FOR DISPOSABLE TISSUES
Filed Aug. 2, 1956
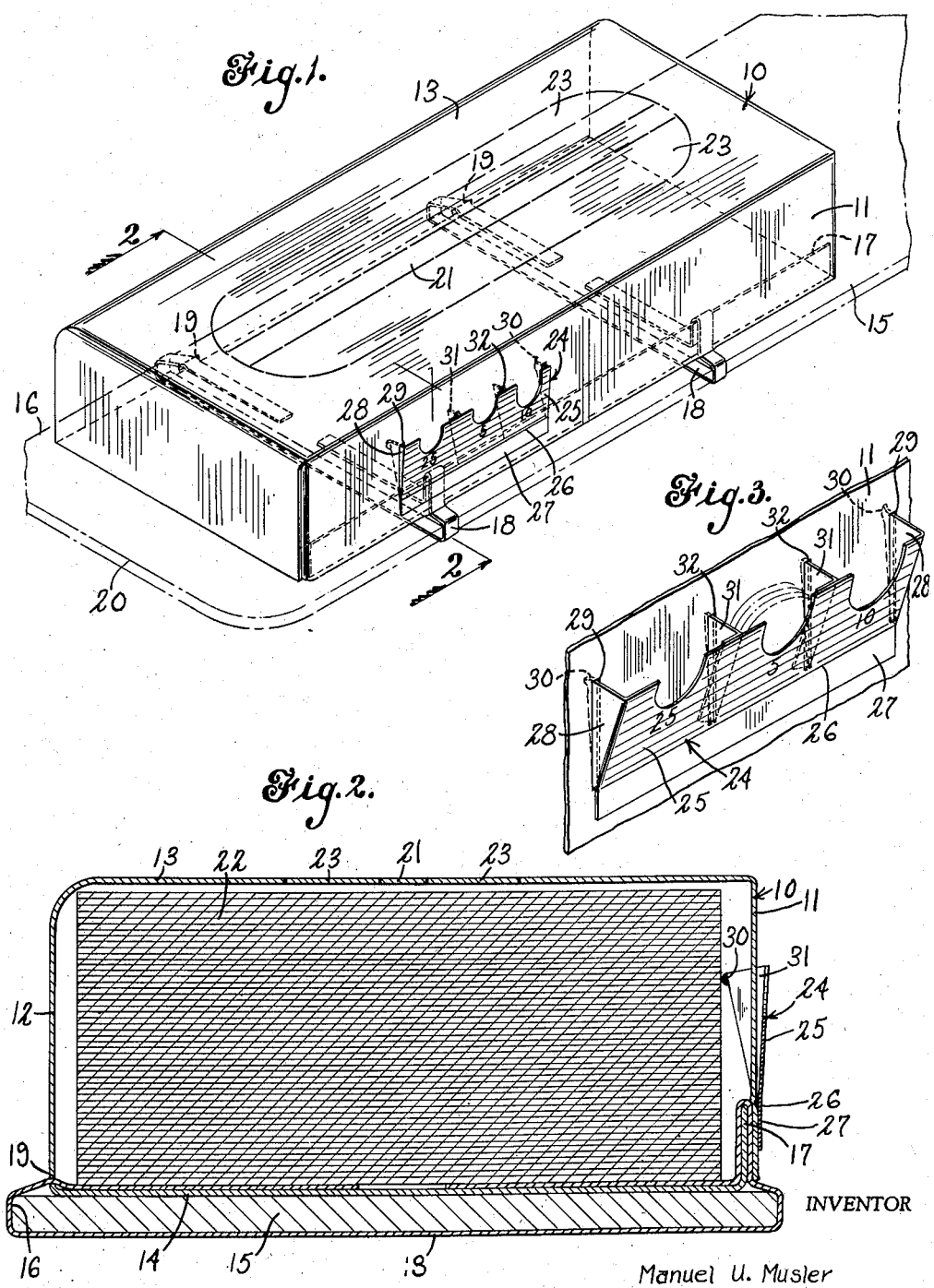
INVENTOR
Manuel U. Musler
BY
ATTORNEYS United States Patent Office 2,826,334
Patented Mar. 11, 1958

2,826,334

CONTAINER FOR DISPOSABLE TISSUES

Manuel U. Musler, New Haven, Conn.

Application August 2, 1956, Serial No. 601,818

2 Claims. (Cl. 221—45)

This invention relates to containers for disposable tissues and relates more particularly to containers for disposable tissues having means for removable attachment to sun visor panels of vehicles, or other similar supporting members, and which containers may be thrown away when the tissue supply is exhausted.

It has become common practice to carry in automobiles cardboard containers of interleaved disposable tissues. Such tissues have a multitude of uses in automobiles. For example, disposable tissues may be used as handkerchiefs, used in the care of infants and small children, used to clean driving glasses, and used to clean automobile window glass and rear vision mirrors.

However, cardboard containers of disposable tissues are usually in the way of the vehicle occupants when placed on the seats and, therefore, are customarily carried on the rear window ledge. This, however, may be a difficult place to reach, especially for the driver who is very often alone in the vehicle. Heretofore, permanent containers (automobile accessories) of plastic or other material for supporting a quantity of disposable tissues on the sun visors of vehicles have found some acceptance. The sun visor of a vehicle is a very convenient support for disposable tissues. However, these automobile accessories are usually not available at outlets for disposable tissues such as drug stores and supermarkets, for example. Moreover, these automobile accessories are often cumbersome and must be refilled each time the supply of tissues is exhausted.

One object of the invention i sto provide a container for disposable tissues, having simple means for removable attachment to the sun visor of a vehicle, which may be thrown away when the supply of tissues is exhausted, which may be very strongly supported on sun visors of various shapes and dimensions, which has little bulk, and which may be produced very economically.

Further objects of the invention will be apparent from the following detailed description of the container illustrated in the drawing by way of example.

In the drawing:

Fig. 1 is a perspective view illustrating a container for disposable tissues, embodying the invention and supported on a vehicle sun visor;

Fig. 2 is an enlarged sectional view on line 2—2 of Fig. 1; and

Fig. 3 is a fragmentary perspective view illustrating the coin receptacle forming a part of the container.

As shown in Fig. 2, the body 10 of the container, which is formed of cardboard or the like, has a front 11, back 12, top 13 and bottom 14 constructed from a single continuous sheet of material. The body 10 of the container is oblong in plan and is provided with the usual closure flaps at the ends thereof. As shown in the last-mentioned view, the body 10 may be rounded at the junction of the back 12 and the top 13 to inhibit rupture or creasing of the fabric vehicle ceiling (not shown) through contact of the latter with the body 10 supported on the sun visor 15. The rounding of the body 10 at the junction of the back 12 with the top 13 also permits the rear edge 16 of the container-equipped visor to occupy a position nearer the vehicle ceiling, not shown. The bottom 14 of the body is provided with an upwardly extending lip 17 adjacent the inner surface of the front 11 and extending throughout the length thereof. Two elastic cords or tapes 18 extend over the lip 17 in the manner indicated in Fig. 1 and are sandwiched between the lip 17 and the front 11. The lip 17 is adhesively secured to the front 11 throughout the length thereof except in the regions of the tapes 18, the arrangement being such that the container body 10 is sealed along the lower front edge thereof.

The tapes 18 extend transversely of the oblong body 10 in parallel relation to one another, the tapes 18 being spaced inwardly from the respective ends of the body 10, as shown in Fig. 1. Each tape 18 extends through a slot 19 formed in the back 12 of the body adjacent the bottom 14, the tape having the ends thereof arranged in spaced apart and opposing relation to one another, the ends of the tape being adhesively anchored to the uppermost surface of the bottom 14. The arrangement is such that when the container is removed from the sun visor the portion of each tape which extends below and across the container from front to back lies snugly against the bottom 14. To secure the container to the sun visor 15 is is only necessary to stretch and slip the tapes 18 over the free end 20 of the visor so that the container may occupy the position on the sun visor shown in Fig. 1. As shown in Fig. 1, the visor 15 extends beyond the front, back and ends of the container, the container being firmly held down on the upper surface of the visor by the elastic tapes 18. The arrangement of the tapes is such that the tapes are very firmly anchored in the container. The tapes 18 which embrace the sun visor and extend outwardly from the front and back of the container over the front and rear edges of the visor (see Fig. 2) may be maintained under considerable tension by the visor.

The container body 10 is provided with the usual tear strip 21 in the central part of the top 13, which, when removed, permits the supply of tissue to be dispensed through the top 13. The tissue, which may be interleaved in a conventional manner, is shown in the drawing more or less diagrammatically, the tissue being indicated at 22. Two wider tear strips 23 are formed in the top 13 adjoining the respective sides of the tear strip 21. When the supply of tissues 22 has been partially or completely exhausted the tear stripes 23 may be removed from the top 13 of the container to provide an enlarged opening through which articles such as sun glasses and cards, for example, may be inserted in the container for easy storage and ready access, so that the container provides a general catch-all for the car operator.

The front 11 of the container is provided with a receptacle for coins needed for road tolls, parking meters, etc., the coin receptacle being indicated generally at 24. As best shown in Fig. 3, the coin receptacle 24 comprises a strip 25 of cardboard or the like elongated longitudinally of the front 11, having a number of finger recesses formed in the upper edge thereof, three recesses being shown. The strip 25 is longitudinally scored, as at 26, so that the upper part of the strip is hinged on the lower edge portion 27 which is adhesively secured to the outer surface of the front 11 of the container. The upper part of the strip 25 is provided with integral end flanges 28 which extend inwardly in sliding relation through slots 29 formed in the front 11 of the container, the flanges 28 having stop portions 30 engageable with the inner surface of the front 11 to limit outward sliding movement of the flanges. The end finger recesses are separated from the center finger recess (see Fig. 3) by partition members 31 fixed to the strip 25 and slidable in slots 32 formed in the front 11 of the container. The arrangement is such that the upper hinged part of the strip 25 may be pulled out from the position shown in Fig. 1 to the position shown in Fig. 3 to receive coins of various denominations.

In accordance with the foregoing description, there is provided a disposable container for removable attachment to the sun visor panel of an automobile or other similar supporting member. The container is provided with simple means for strongly supporting the container on sun visors of various shapes and sizes. Furthermore, the container is provided with a coin receptacle, has little bulk, and may be produced economically. The entire package may be wrapped (not shown) in transparent plastic film to protect the package in handling and shipment.

While only one form of the container has been illustrated and described herein, it will be apparent that the container is susceptible of various changes in details without departure from the principles of the invention and the scope of the appended claims.

What I claim is:

1. In an article of the class described, a throw-away container formed from a single sheet of fibrous material for holding a plurality of disposable tissues, the container having a top, bottom, front and back and being of oblong form in plan, the bottom having an upwardly extending lip within and adjacent the front and extending substantially throughout the length thereof, the top of the container having a longitudinal tear strip formed therein which, when removed, forms a dispensing aperture for tissues in the top, and a pair of elastic cords fixed to the fibrous material of the container for suporting the container on an automobile sun visor, the cords extending from front to back below the bottom in spaced apart and parallel relation, each cord extending through the back and having one end permanently secured to the bottom, each cord having the other end thereof permanently secured to the bottom in opposing relation to the first end, the cords extending over the lip and being sandwiched between the latter and the front, and the cords being adapted to elastically embrace the sun visor.

2. In an article of the class described, a throw-away container formed from a sheet of fibrous material for holding a plurality of disposable tissues, the container having a top, bottom, front and back and being of oblong form in plan, the top of the container having a longitudinal tear strip formed therein which, when removed, forms a dispensing aperture for tissues in the top, and a pair of elastic cords fixed to the fibrous material of the container for supporting the container on an automobile sun visor, the cords extending below the bottom in spaced apart and parallel relation and having the respective ends thereof extending into the container from the front and the back, the cords having their ends permanently secured to the bottom, and the cords being adapted to elastically embrace the sun visor, the top of the container being provided with two wider tear strips adjoining the respective sides of said longitudinal tear strip.

References Cited in the file of this patent

UNITED STATES PATENTS

| | | |
|---|---|---|
| 2,287,581 | Walker | June 23, 1942 |
| 2,341,570 | Reachi | Feb. 15, 1944 |
| 2,672,233 | Baxter | Mar. 16, 1954 |
| 2,773,532 | Nash | Dec. 11, 1956 |